US011668331B2

(12) United States Patent
Brucksch

(10) Patent No.: US 11,668,331 B2
(45) Date of Patent: Jun. 6, 2023

(54) DEVICE FOR INTERLOCKING AND/OR FRICTIONAL CONNECTION, AND METHOD

(71) Applicant: Siemens Aktiengesellschaft, Munich (DE)

(72) Inventor: Michael Brucksch, Buttenheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 6 days.

(21) Appl. No.: 17/295,769

(22) PCT Filed: Nov. 18, 2019

(86) PCT No.: PCT/EP2019/081601
§ 371 (c)(1),
(2) Date: May 20, 2021

(87) PCT Pub. No.: WO2020/104354
PCT Pub. Date: May 28, 2020

(65) Prior Publication Data
US 2022/0018368 A1   Jan. 20, 2022

(30) Foreign Application Priority Data
Nov. 21, 2018   (EP) ..................................... 18207502

(51) Int. Cl.
*B23P 19/04* (2006.01)
*F16B 2/00* (2006.01)

(52) U.S. Cl.
CPC ................ *F16B 2/00* (2013.01); *B23P 19/04* (2013.01)

(58) Field of Classification Search
CPC .. F16B 2/00; B23P 19/04; B23P 19/06; B23P 19/10; B25J 11/005; B25J 9/0096
See application file for complete search history.

(56) References Cited

U.S. PATENT DOCUMENTS 4,773,156 A     9/1988   Kurita
10,150,213 B1 *  12/2018  Linnell ................. B25J 9/1679
(Continued)

FOREIGN PATENT DOCUMENTS

DE   10 2013 227 147 A1   6/2015
DE   10 2015 210 255 A1   12/2016
(Continued)

OTHER PUBLICATIONS

PCT International Search Report and Written Opinion of International Searching Authority dated Mar. 17, 2020 corresponding to PCT International Application No. PCT/EP2019/081601 filed Nov. 18, 2019.

Primary Examiner — Jun S Yoo
(74) Attorney, Agent, or Firm — Henry M. Feiereisen LLC

(57) ABSTRACT

An apparatus for connecting a workpiece to a connection element in a form-fit and/or force-fit manner includes a robot for positioning the workpiece, a spindle for connecting the connection element to the workpiece, and a first support to stabilize the workpiece as the connection element is connected to the workpiece. The first support has a contact region substantially in alignment with a spindle longitudinal axis and in contact with the workpiece during connection of the connection element to the workpiece. The contact region has a size which is smaller than 0.01 m². A second support to stabilize the workpiece as the connection element is connected to the workpiece has a support surface which in a state in which the workpiece is supported in a substantially orthogonal axis relative to the longitudinal axis of the spindle is disposed in a different plane than a support surface of the first support.

16 Claims, 3 Drawing Sheets

(56) References Cited

U.S. PATENT DOCUMENTS

| | | |
|---|---|---|
| 2011/0048649 A1 | 3/2011 | Komatsu et al. |
| 2016/0031051 A1 | 2/2016 | Izumiya |
| 2018/0169813 A1 | 6/2018 | Wanner et al. |
| 2019/0143399 A1* | 5/2019 | Kasahara ............... B25J 19/023 |
| | | 29/525.06 |

FOREIGN PATENT DOCUMENTS

| | | | | |
|---|---|---|---|---|
| EP | 3421172 A1 * | 1/2019 | .............. | B23P 19/04 |
| WO | WO 2017/145349 A1 | 8/2017 | | |
| WO | WO 2017/188127 A1 | 11/2017 | | |

* cited by examiner

DEVICE FOR INTERLOCKING AND/OR FRICTIONAL CONNECTION, AND METHOD

CROSS-REFERENCES TO RELATED APPLICATIONS

This application is the U.S. National Stage of International Application No. PCT/EP2019/081601, filed Nov. 18, 2019, which designated the United States and has been published as International Publication No, WO 2020/104354 A1 and which claims the priority of European Patent Application, Serial No. 18207502.8, filed Nov. 21, 2018, pursuant to 35 U.S.C. 119(a)-(d).

BACKGROUND OF THE INVENTION

The invention relates to an apparatus for connecting at least one workpiece in a form-fit and/or force-fit manner to at least one connection element, and a method.

Robots are known from the prior art which have a screw apparatus on their effector. These can screw screws into a workpiece disposed on a table.

However, not all sides of the workpiece can be processed in this manner.

The object underlying the invention is therefore to create an apparatus which enables screws to be screwed in on all workpiece sides.

SUMMARY OF THE INVENTION

The object is achieved by an apparatus for connecting at least one workpiece in a form-fit and/or force-fit manner to at least one connection element, having at least one robot for positioning the workpiece, at least one spindle for connecting the connection element to the workpiece, at least one support for stabilizing the workpiece during the connection of the connection element to the workpiece, wherein a contact region of the support which is in contact with the workpiece during the connection of the connection element to the workpiece is substantially in alignment with the spindle longitudinal axis and the contact region is smaller than 0.01 m$^2$, in particular smaller than 0.0001 m$^2$.

The spindle is preferably a threaded spindle. The connection means is preferably a screw.

The apparatus is however also suitable for other connection elements such as nails and rivets.

The definition according to which the contact region of the support is substantially in alignment with the spindle longitudinal axis likewise comprises in particular the scenarios in which the contact region of the support overlaps with a notional spherical body having a radius of 5 cm and having as its center the point of intersection of the spindle longitudinal axis with the workpiece side surface which is in contact with the support.

The spatial assignment of the contact region to the spindle longitudinal axis or the spherical body is present in particular at the moment when the contact region is fitted to the workpiece.

The support is in particular raised with respect to its surrounding area.

In an advantageous embodiment of the invention, the support has a support longitudinal axis. The support longitudinal axis preferably intersects the spherical body.

The support longitudinal axis of the support preferably corresponds substantially to the spindle longitudinal axis of the spindle.

During the connection of the workpiece and connection element, the support and/or the support element is preferably in contact with the workpiece.

During the connection, the workpiece rests preferably with its underside on the contact region of the support and/or support element.

Because the support longitudinal axis of the support preferably corresponds substantially to the spindle longitudinal axis of the spindle, the workpiece is supported at the point where the screw is screwed in.

In an advantageous embodiment of the invention, the support and/or at least one support element of the support which comprises the contact region is embodied to be movable along a support longitudinal axis.

The support element comprises the contact region of the support which is in contact with the workpiece during the connection of the connection element to the workpiece.

The support and/or support element is preferably movable by means of pneumatics.

Moving the support or support element by means of pneumatics is advantageous because air is available in any quantity and exhaust air produced can escape into the atmosphere, for which reason no return line is required as for example with hydraulic or electric systems (which can however likewise be used).

Compressed air can moreover be stored readily. Pneumatic systems, in particular lifting systems, are moreover particularly lightweight.

The support and/or support element is preferably embodied to be cylindrical.

In a further advantageous embodiment of the invention, the apparatus has a first control unit and a second control unit, wherein the first control unit is provided for controlling the robot and the second control unit is provided for controlling the support, the spindle and the first control unit.

The first control unit preferably controls all movements and actions of the robot. The first control unit is preferably integrated into the robot.

The second control unit preferably knows the position of the workpiece and/or specifies for example how far the support and/or support element is to be moved in order to support the workpiece in an optimum manner.

This described embodiment is particularly economical.

In an alternative advantageous embodiment of the invention, the apparatus has at least one higher-level control unit.

The robot preferably has at least one robot control unit.

The spindle preferably has at least one spindle control unit.

The support preferably has at least one support control unit.

In the alternative embodiment, the robot control unit, spindle control unit and support control unit are preferably connected to the higher-level control unit.

This embodiment enables individual components to be replaced easily, as the spindle, robot and support have a separate control unit.

In a further advantageous embodiment of the invention, the robot is a lightweight robot.

Lightweight robots are usually so light that they can be carried by one person. Moreover, the lightweight robot can easily learn positioning tasks by means of a "teach-in" method.

The lightweight robot preferably has sensors which detect a collision. The lightweight robot stops autonomously. This collision protection enables human-machine collaboration without a protective cage.

In a further advantageous embodiment of the invention, the robot has an arm portion length of less than 1 m, in particular less than 50 cm, in each case.

In this context, arm portion length means the length from one joint to the adjacent joint.

The arm portion length is preferably longer than 20 cm in each case.

As a result, the robot is very compact. Installations and apparatuses according to the invention can likewise be embodied to be compact and small.

In a further advantageous embodiment of the invention, the robot has at least one workpiece receiving unit on at least one effector.

As is known, the effector is the final arm piece of a robot. The workpiece receiving unit serves to receive the workpiece.

The workpiece is disposed on a table, for example. The workpiece receiving unit can receive the workpiece so that it can be positioned correctly by the robot.

The effector is preferably movable along at least five motion axes for the free movement of the workpiece in the space. In this way, every spatial point is accessible.

At least three motion axes of the effector are preferably axes of rotation.

Preferably, however, all motion axes of the effector are axes of rotation.

In a further advantageous embodiment of the invention, the workpiece receiving unit comprises at least one suction cup for receiving the workpiece.

The suction cup preferably has elastic material.

The suction cup is preferably pressed onto the workpiece.

The suction cup is particularly suitable for the temporary fastening of the workpiece, as a high weight can be carried on account of its suction force.

The workpiece receiving unit preferably has a plurality of suction cups.

The workpiece receiving unit preferably has at least two suction cups.

The workpiece receiving unit, in particular a workpiece receiving unit which is to carry high loads safely and reliably, preferably has at least four suction cups.

In a further advantageous embodiment of the invention, the workpiece receiving unit has at least one counter-bearing for stabilizing the workpiece.

In this way, the received workpiece can be stabilized particularly well.

The counter-bearing is preferably embodied to be cylindrical.

The counter-bearing is preferably embodied such that, for a workpiece received by the at least one suction cup, the counter-bearing is in contact with the workpiece.

The workpiece receiving unit preferably has a plurality of counter-bearings.

The workpiece receiving unit preferably has at least two counter-bearings.

The workpiece receiving unit, in particular a workpiece receiving unit which is to reliably prevent a tilting of the received workpiece during the connection to the connection element, preferably has at least four suction cups.

The at least one counter-bearing is particularly suitable as a brace.

In a further advantageous embodiment of the invention, the spindle is rigid.

In this context, rigid means that the spindle is not movable and is arranged at a fixed point in the space.

A spindle of this kind is less fault-prone, as it has fewer mechanical parts. Moreover, a spindle of this kind can be realized cost-effectively.

In a further advantageous embodiment of the invention, an end piece of the spindle is movable along the spindle longitudinal axis.

The spindle end piece preferably carries the connection element, in particular the screw.

In a further advantageous embodiment of the invention, the end piece of the spindle is rotatable about the spindle longitudinal axis.

The screw is screwed in particularly well by the spindle end piece being rotated about the spindle longitudinal axis and simultaneously moved forward along the spindle longitudinal axis in the direction of the workpiece.

The spindle end piece preferably rotates in a speed range of 10 to 500 revolutions per minute.

This embodiment enables the screw to be screwed efficiently into the workpiece.

The speed at which it is screwed in preferably depends on a geometry of the connection means, in particular screw. For example, a screw with thread M4 is screwed into the workpiece by between 0.6 mm and 0.8 mm, in particular 0.7 mm, per revolution.

For example, a screw with thread M6 is screwed in by between 0.9 mm and 1.1 mm, in particular 1.0 mm, per revolution.

In a further advantageous embodiment of the invention, the spindle has a feed unit for the automatic feeding of connection elements.

This is for example a funnel or another storage container filled with screws and/or other connection elements and a feed line to the spindle end piece.

In a further advantageous embodiment of the invention, the apparatus has at least a second support for stabilizing the workpiece during a connection of the connection element to the workpiece.

The second support is preferably rigid.

In this way, the workpiece can be positioned by means of the robot such that, during the step of connecting the connection element to the workpiece, the workpiece rests on the first or the second support for stabilization.

In particular, the second support is not disposed in the longitudinal axis of the first support.

This enables the first or second support to be selected as a function of the geometry of the workplace in relation to the position of the opening for the connection element on the workpiece.

As a result, during a connection of the connection element to the workplace, a counter-bearing can likewise be realized by the second support if a sensitive structure capable of withstanding only a low mechanical load is aligned with the spindle axis on the side surface of the workpiece facing toward the support.

The second support is preferably embodied to be parallel to the support and has a bracing function.

The apparatus preferably has a third support embodied in the same manner.

In a further advantageous embodiment of the invention, in the state in which the workplace is supported in an at least substantially orthogonal axis relative to the spindle longitudinal axis, a support surface of the support is disposed in a different plane than a support surface of the second support.

In the state in which the workplace is supported in an at least substantially orthogonal axis relative to the spindle longitudinal axis, the support surface of the support is preferably disposed in a different plane than a support surface of the third support.

In the state in which the workpiece is supported in an at least substantially orthogonal axis relative to the spindle longitudinal axis, the support surface of the second support is preferably disposed in the same plane as the support surface of the third support.

In a further advantageous embodiment of the invention, the apparatus has at least one camera and/or at least one visual sensor.

These can be used for example to document the values with which the screws are screwed into the workpiece. In particular a tightening torque, a tightening angle and a depth are captured.

The counter-bearing already described helps to determine the depth in a precise manner. Without the counter-bearing, the robot would deviate and measurement values would be distorted.

Captured data is preferably stored in a database, in particular for traceability and optimizations to the apparatus.

The apparatus is suitable for connecting a workpiece to a connection element, in particular screw.

The apparatus is likewise suitable for connecting two workpieces to one another via the connection element.

The aforementioned object is further achieved by a method for connecting at least one workpiece to at least one connection element in a form-fit and/or force-fit manner with an apparatus of this kind, with the following steps:
  receiving the workpiece by means of the workpiece receiving unit,
  positioning the workpiece by means of the robot,
  fitting the contact region of the support to the workpiece,
    moving the end piece of the spindle in the direction of the spindle longitudinal axis,
  connecting the connection element to the workpiece by means of a rotational movement of the spindle.

The initial fitting of the contact surface of the support to the workpiece preferably takes place after the workpiece has been received by the workpiece receiving unit. In the case of a movable support, the initial fitting of the contact surface of the support to the workpiece preferably takes place after the workpiece has been positioned by the robot.

In an advantageous embodiment of the invention, the support and/or the support element is moved in the direction of the support longitudinal axis until the contact surface of the support/support element comes into contact with the workpiece.

The workpiece is preferably positioned freely in the space and the support and/or support element is moved along the support longitudinal axis, which corresponds to the spindle longitudinal axis, until it comes into contact with the workpiece.

During this process, the workpiece is supported at certain points.

The method uses axial feed and rotation in an efficient manner to establish a connection between the workpiece and the connection element. The workpiece is furthermore supported, on account of which the connection element is introduced with pinpoint accuracy.

The workpiece is preferably positioned such that a longitudinal axis of a connection channel on the workpiece corresponds to the spindle longitudinal axis.

The connection channel is preferably already present, in particular via a pre-drilled borehole. The workpiece preferably already has a thread in the connection channel.

In a further advantageous embodiment of the invention, the workpiece is placed on the second and/or third support.

The second and third supports are preferably rigid. This embodiment is particularly suitable for large and/or heavy workpieces.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
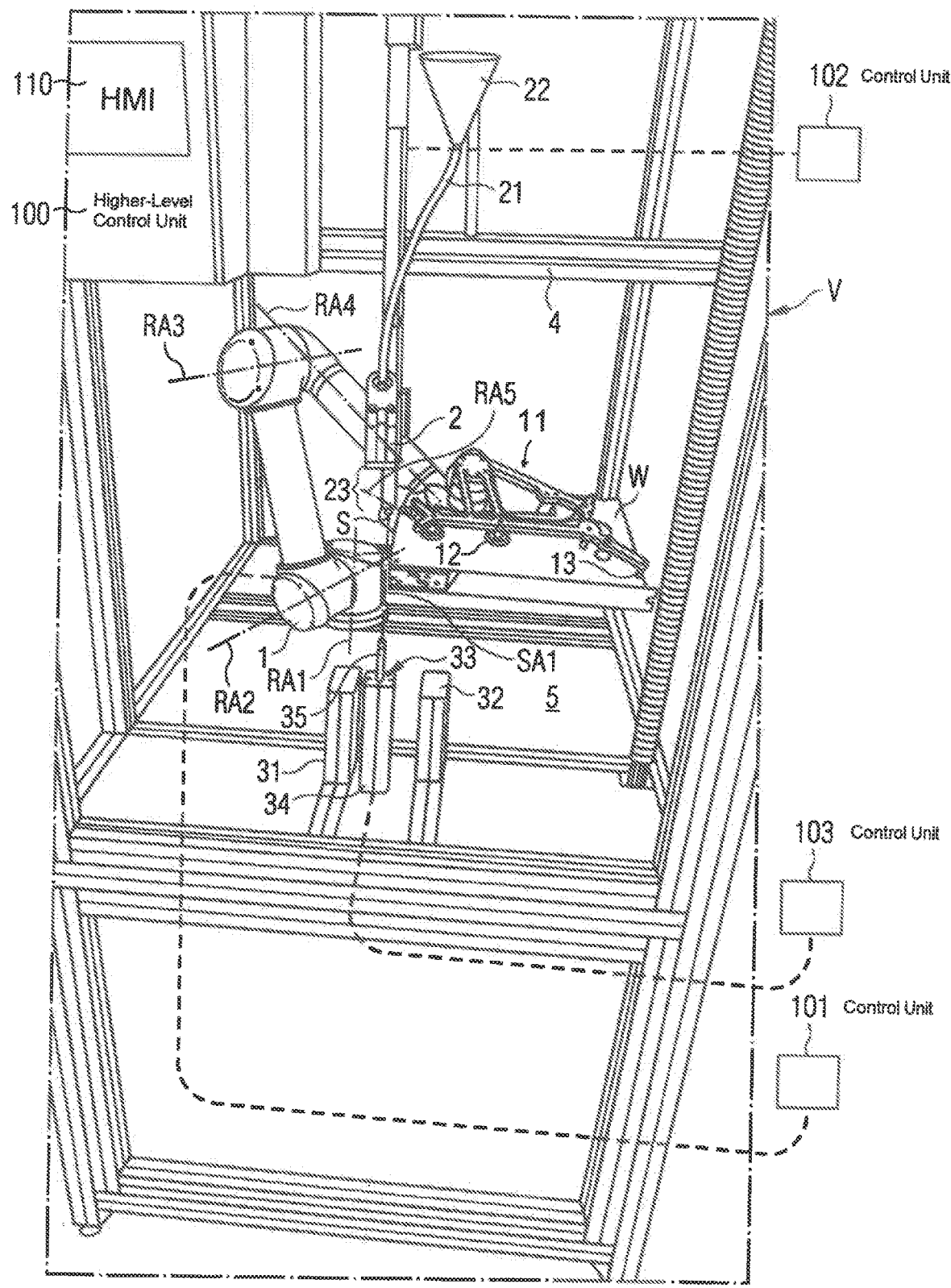
FIG. 1 shows a possible embodiment of the apparatus according to the invention for connecting at least one workpiece to at least one connection element in a form-fit and/or force-fit manner.

FIG. 1 shows a possible embodiment of the apparatus V according to the invention for connecting at least one workpiece W to at least one connection element S in a form-fit and/or force-fit manner, having a robot 1 for positioning the workpiece, a spindle 2 for connecting the connection element S to the workpiece W and two different kinds of supports 31, 32, 33 for stabilizing the workpiece W during the connection of the connection element S to the workpiece.

The figure shows a robot 1, in particular a lightweight robot. The robot has five motion axes RA1 . . . 5. These motion axes RA1 . . . 5 are axes of rotation. These motion axes make it possible for a workpiece W, which the robot 1 has received using a workpiece receiving unit 11 on its effector, to be able to reach any spatial point.

Figure 3:
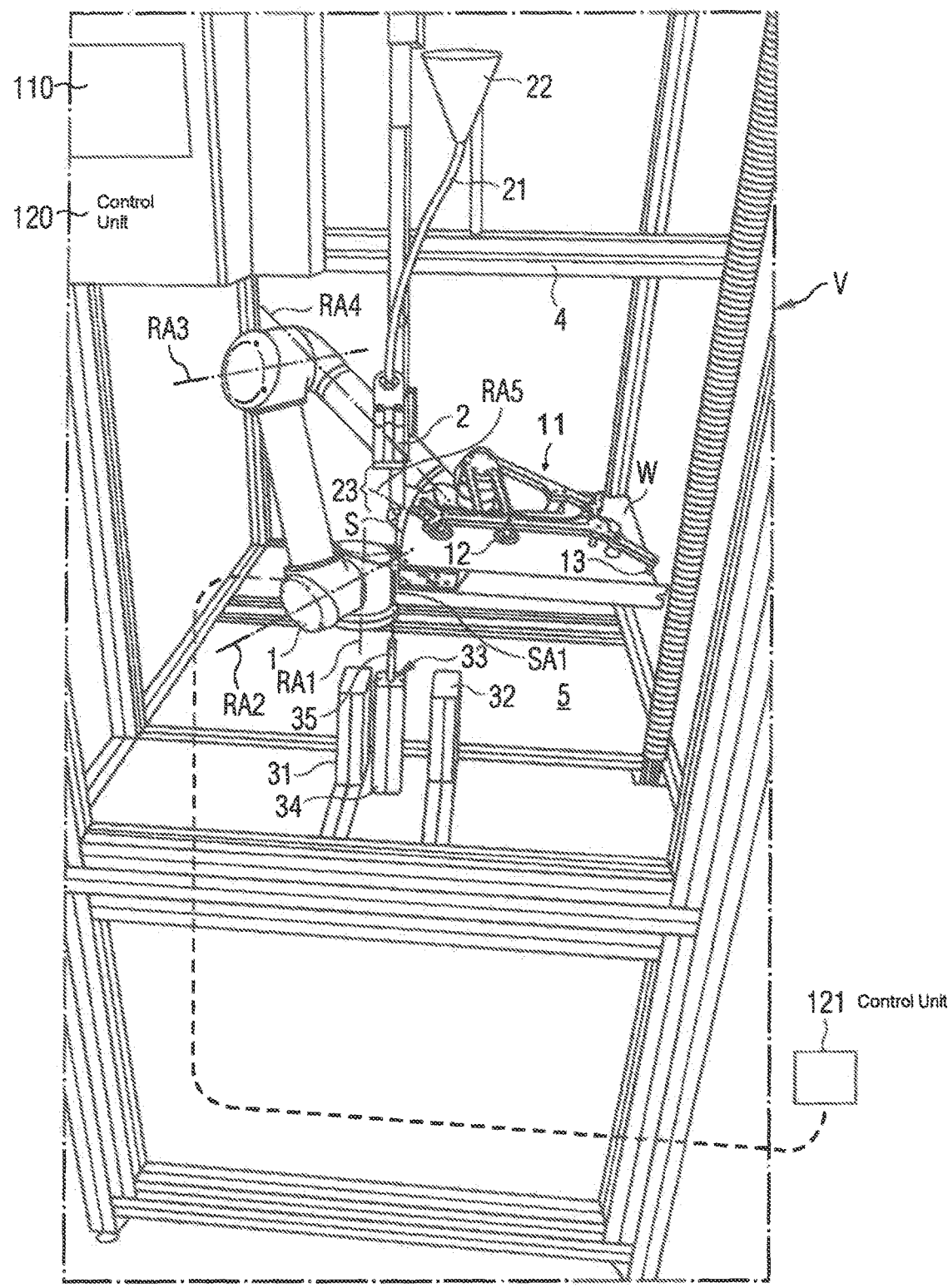
FIG. 3 shows a further possible embodiment of the apparatus according to the invention for connecting at least one workpiece to at least one connection element in a form-fit and/or force-fit manner.

In FIG. 3, the workpiece receiving unit 11 has suction cups 12 and counter-bearing 13. The counter-bearing 13 serves to stabilize the received workpiece W.

The figure shows that the robot is fixed on a surface 5, which is preferably aligned parallel to the ground.

The supports 31, 32 and 33 are also fixed on this surface.

The figure shows that the two supports 31 and 32 are rigid supports. They are not movable.

The support 33 is a movable support with a rigid support element 34 and a movable support element 35. The figure shows that the movable support element 35 is narrow and cylindrical. The support element 35 is advantageously moved by means of pneumatics. The mechanical work to move the support element 35 can however also be performed by means of hydraulics or an electrical drive.

The spindle 2 is, as shown in the figure, rigid, in other words it is not movable and is arranged at a fixed point in the space.

The spindle 2 has a feeder for connection elements 21, in particular for screws. The feeder 21 is connected at one end to a storage apparatus 22 for connection means. This is a funnel in the figure. The connection means in the funnel are guided through the feeder 21 to the spindle end piece 23.

The spindle end piece 23 is movable along a spindle longitudinal axis SA1. This is necessary so that the connection means can be introduced into the workpiece W. This is necessary in particular for screws and also for nails, for example. In order to be able to screw a screw through the spindle 2 and the spindle end piece 23 into the workpiece W, the spindle performs a rotation about the spindle longitudinal axis FA1.

As shown in the figure, the spindle end piece 23 lies in a direct extension of the movable part of the movable support element 35, in other words the spindle longitudinal axis corresponds to a longitudinal axis of the support element 35 (also support longitudinal axis). This is advantageous since a stabilization at certain points, which is ensured by the support element 35, is necessary for example when screwing a screw into the workpiece W.

The spindle 2 is fixed on a rail 4 and cannot be moved. The spindle 2 is rigid. Only the spindle end piece 23 is, as already explained, movable along the spindle longitudinal axis and rotatable about the spindle longitudinal axis.

The rail 4 is supported by the two side braces.

The figure also shows a higher-level control unit 100 with an HMI 110. The figure also shows that the robot 1 is actuated via a control unit 101, that the spindle 2 is actuated via a control unit 102 and that the movable support 33 is actuated via a control unit 103.

The arrangement, distribution and display of the control units 101, 102, 103 and the higher-level control unit 100 are optional. It is also possible for a control unit to perform all control functions for robot, spindle and support.

The described apparatus can be arranged in a cabin, for example in a cabin with a glass panel. This serves to protect an operator.

The apparatus can however also be embodied without a cabin, in particular if the technical devices, in particular robot, spindle and movable support, are touch-sensitive and thus do not pose a danger to the operator.

Figure 2:
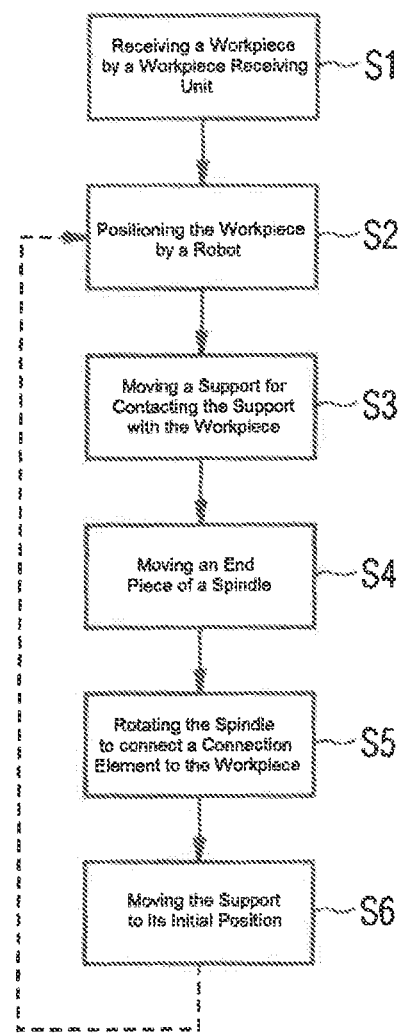
FIG. 2 shows a possible sequence of the method according to the invention for connecting at least one workpiece to at least one connection element in a form-fit and/or force-fit manner with an apparatus of this kind.

FIG. 2 shows a possible sequence of the method according to the invention for connecting at least one workpiece to at least one connection element in a form-fit and/or force-fit manner with an apparatus of this kind.

In a method step S1, the workpiece is received by the workpiece receiving unit.

The workpiece is preferably received and held by the suction cups.

In a method step S2, the workpiece is positioned by the robot.

The workpiece is preferably positioned such that a longitudinal axis of a connection channel on the workpiece corresponds to the spindle longitudinal axis.

In a method step S3, the support and/or the support element is moved in the direction of the support longitudinal axis until it comes into contact with the workpiece.

In a method step S4, the end piece of the spindle is moved in the direction of the spindle longitudinal axis.

In a method step S5, the connection element is connected to the workpiece by a rotational movement of the spindle.

The method steps S3, S4 and S5 preferably take place at the same time.

Once the connection has been established, the spindle end piece is preferably moved back, preferably into its initial position. The support and/or the support element is also preferably moved back, preferably into its initial position. This preferably takes place in a method step S6.

The workpiece can be repositioned (S2) in order to introduce a further connection means, in particular to screw in a further screw.

FIG. 3 shows a further possible embodiment of the apparatus V according to the invention for connecting at least one workpiece W to at least one connection element S in a form-fit and/or force-fit manner.

The embodiment shown is similar to the embodiment described in FIG. 1. However, it differs with regard to an actuation of the components.

The figure shows a first control unit 121, which controls the robot 1. The first control unit 121 is preferably integrated into the robot.

A second control unit 120 with an HMI 110 is provided to control the support (33), the spindle (2) and the first control unit (121).

The invention claimed is:

1. An apparatus for connecting a workpiece to a connection element in a form-fit and/or force-fit manner, said apparatus comprising:
    a robot for positioning the workpiece;
    a spindle for connecting the connection element to the workpiece;
    a first support configured to stabilize the workpiece as the connection element is connected to the workpiece, said first support having a contact region substantially in alignment with a longitudinal axis of the spindle and in contact with the workpiece during connection of the connection element to the workpiece, said contact region having a size which is smaller than 0.01 m$^2$; and
    a second support configured to stabilize the workpiece as the connection element is connected to the workpiece, said second support having a support surface which in a state in which the workpiece is supported in a substantially orthogonal axis relative to the longitudinal axis of the spindle is disposed in a different plane than a support surface of the first support.

2. The apparatus of claim 1, wherein the size of the contact region is smaller than 0.0001 m$^2$.

3. The apparatus of claim 1, wherein the first support is configured for movement along a longitudinal axis thereof.

4. The apparatus of claim 1, wherein the first support includes a support element which is configured for movement along a longitudinal axis of the first support.

5. The apparatus of claim 1, further comprising:
    a first control unit configured to control the robot; and
    a second control unit configured to control the first support, the spindle and the first control unit.

6. The apparatus of claim 1, wherein the robot is embodied as a lightweight robot.

7. The apparatus of claim 1, wherein the robot has an arm portion length of less than 1 m.

8. The apparatus of claim 1, wherein the robot has an arm portion length of less than 50 cm.

9. The apparatus of claim 1, wherein the robot comprises an arm having a final arm piece to form an effector, and a workpiece receiving unit which is disposed on the effector.

10. The apparatus of claim 9, wherein the workpiece receiving unit comprises a suction cup for receiving the workpiece.

11. The apparatus of claim 9, wherein the workpiece receiving unit comprises a counter-bearing for stabilizing the workpiece.

12. The apparatus of claim 1, wherein the spindle is rigid.

13. The apparatus of claim 1, wherein the spindle includes an end piece which is movable along a spindle longitudinal axis.

14. The apparatus of claim 13, wherein the end piece of the spindle is configured for rotation about the spindle longitudinal axis.

15. The apparatus of claim 1, wherein the spindle comprises a feed unit configured to automatically feed the connection element.

16. The apparatus of claim 1, further comprising a camera and/or a visual sensor.

* * * * *